R. T. SVENDSEN ET AL

Sept. 20, 1932.

PROPELLER MOUNTING

Re. 18,602

Original Filed April 30, 1928 3 Sheets-Sheet 1

Inventors
ROBERT T. SVENDSEN
DAVID G. CHANDLER
By Paul, Paul & Moore
Attorneys

R. T. SVENDSEN ET AL

Sept. 20, 1932. PROPELLER MOUNTING Re. 18,602

Original Filed April 30, 1928 3 Sheets-Sheet 2

Inventors
ROBERT T. SVENDSEN
DAVID G. CHANDLER
By Paul, Paul & Moore
Attorneys

R. T. SVENDSEN ET AL

Sept. 20, 1932. PROPELLER MOUNTING Re. 18,602

Original Filed April 30, 1928 3 Sheets-Sheet 3

Inventors
ROBERT T. SVENDSEN
DAVID G. CHANDLER
By Paul, Paul & Moore
Attorneys

Reissued Sept. 20, 1932

Re. 18,602

UNITED STATES PATENT OFFICE

ROBERT T. SVENDSEN AND DAVID G. CHANDLER, OF MINNEAPOLIS, MINNESOTA

PROPELLER MOUNTING

Original No. 1,735,660, dated November 12, 1929, Serial No. 274,027, filed April 30, 1928. Application for reissue filed November 5, 1931. Serial No. 573,264.

This invention relates to new and useful improvement in propeller mountings, and an object of the invention is to provide such an apparatus adapted to be mounted at the rear end of an ordinary boat or vessel, and comprising a supporting member normally depending into the water and having a propeller journaled at the lower end thereof, and the mounting being adapted to swing in substantially a vertical plane, whereby the propeller may be elevated to an inoperative position.

A further object of the invention is to provide a propeller mounting adapted to swing upon an axis arranged transversely of the boat, whereby the mounting may be vertically adjusted to change the position of the propeller in the water, and a strut having one end connected with the lower end of the mounting and normally positioned to be engaged by an obstruction in the water and to automatically elevate the propeller and its mounting to prevent the latter from engaging the obstruction.

A further object is to provide a propeller mounting comprising a supporting member having a propeller journaled in the lower end thereof, and the lower end of the mounting being adapted to swing about an upright axis, whereby the propeller may be adjusted to guide the vessel through the water, and also whereby the movement of the vessel may be reversed.

A further object is to provide a propeller mounting comprising a propeller supporting member having one end secured to an engine and having a propeller journaled in the opposite end thereof and adapted to be positioned beneath the bottom of the vessel, and the engine being mounted for pivotal movement upon an axis arranged transversely of the vessel, whereby the propeller and its mounting may be swung to a position out of the water or above the bottom of the vessel so as to prevent the propeller from striking the lake bottom and other obstructions.

A further object is to provide an apparatus of the class described, wherein the engine and propeller mounting are connected together as a unit, and the unit is pivotally mounted within the boat and projects through the rear wall thereof, and the relative location of the propeller with respect to the pivot, upon which the unit is mounted, is such that the propeller will effectively propel the boat while the strut rides on the lake bottom, the raising and lowering of the propeller not materially changing the effectiveness of the propeller.

A further object resides in the particular arrangement of the driving connection between the engine and propeller, which includes a drive shaft, an intermediate shaft, and a propeller shaft, geared together in such a manner, with respect to the angle of the propeller blades, that the propeller constantly tends to rotate or swing about the axis of the intermediate shaft, but is locked against such movement by a suitable lock adapted for manual operation.

A further object is to provide in a propeller mounting, a transmission housing carrying a propeller, a drive shaft for the propeller extending from the housing to an engine mounted within the boat, a pivotal support for the housing, means for turning the propeller to guide the boat and means permitting said mounting and propeller to raise automatically when the propeller engages an obstruction in the water.

Other objects of the invention reside in the pivotal mounting of the propeller supporting member and engine in the boat or vessel; the means provided for swinging the propeller about an upright axis to control the steering of the vessel and its movement forwardly and backwardly; the means provided for manually adjusting the position of the propeller; the strut having a pivotal connection with the lower end of the propeller supporting member and having a pivotal sliding connection with the bottom of the vessel, and normally positioned to be engaged by an obstruction in the water, whereby it will be moved upwardly and lift the propeller out of the path of such obstruction; the means provided for manually raising and lowering the propeller with respect to the boat; the means provided for preventing leakage at the point where the propeller mounting projects through the rear wall of the boat; the construction of the steering mechanism; the particular arrangement of the controls with respect to the axis of the pivots supporting the mounting, whereby foreshortening of the connections is prevented, when raising and lowering the propeller; the relative location of the axis about which the engine and propeller mounting swing, with respect to the propeller, which is such as to prevent the propeller from lifting, when operating to reverse the movement of the boat, and which also functions to eliminate excessive strains from the rear end of the boat, should the propeller be shifted into reverse while the boat is traveling forwardly at high speed; and, in the general construction of the apparatus, as a whole.

The particular object of the invention, therefore, is to provide an improved propeller mounting.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
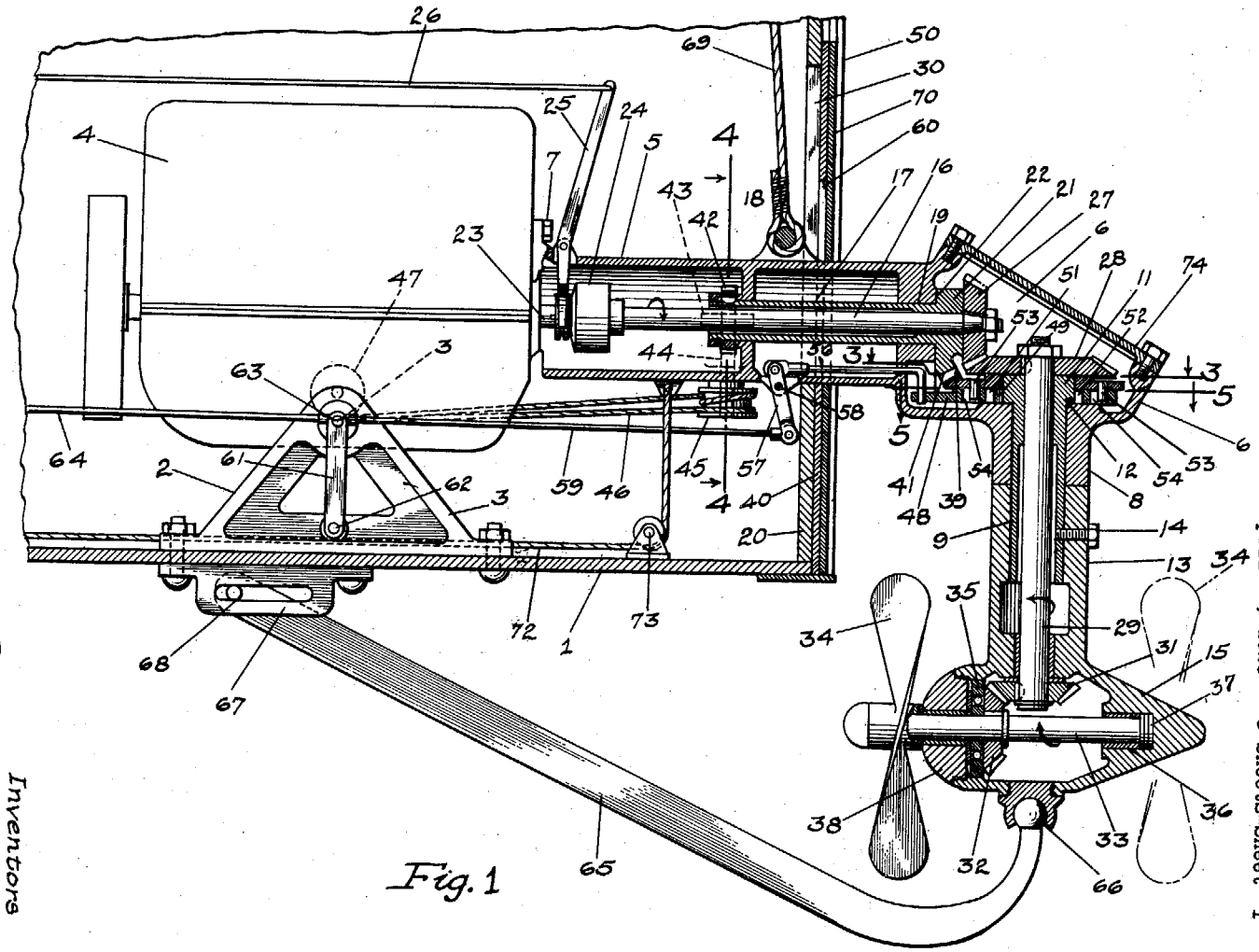
Figure 1 is a vertical sectional view showing the rear portion of a boat or vessel, with the invention applied thereto.
Figure 2:
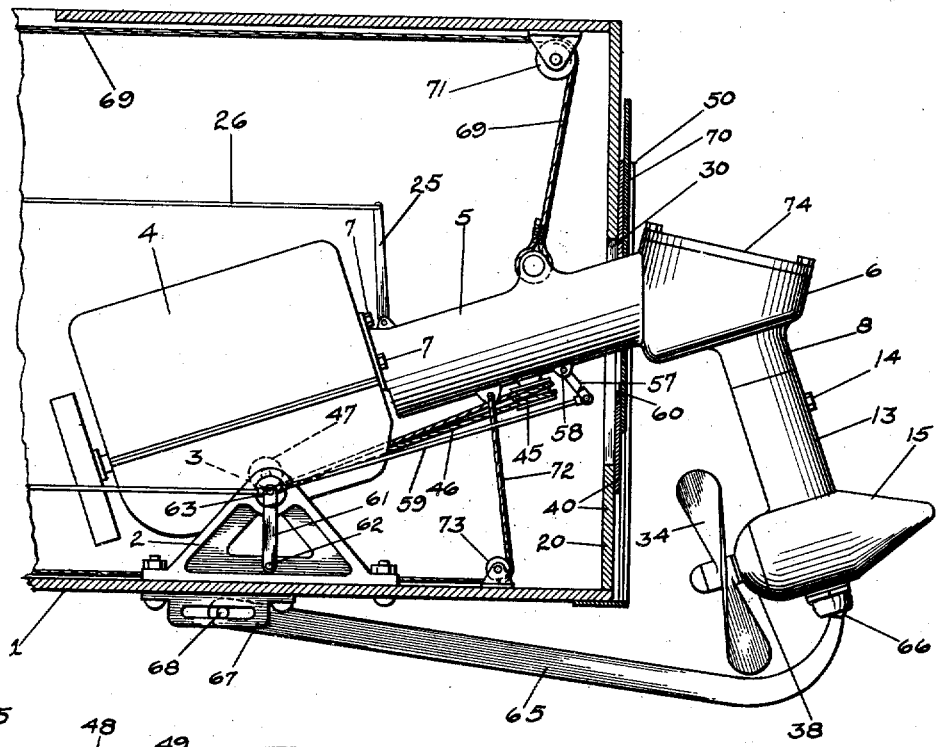
Figure 2 is a view similar to Figure 1, but showing the propeller elevated to a position substantially above the level of the bottom of the boat.

In the selected embodiment of the invention here shown, there is illustrated, for purposes of disclosure, the rear portion 1 of an ordinary boat or vessel, having brackets 2 secured thereto and provided with pivots 3 adapted to pivotally support an engine 4, as shown in Figures 1 and 2.

The propeller supporting means comprises a casing 5, preferably tubular, having one end detachably connected to the engine 4 and having its outer end terminating in a transmission housing 6, best shown in Figure 1. The tubular casing 5 is secured to the engine by suitable bolts 7. A hub 8 is preferably integrally formed with the bottom of the gear housing 6, and has a sleeve 9 mounted for rotation therein, as shown in Figure 1. The upper end of this sleeve has a head 11 seated against the annular seat or face 12 of the hub 8, as shown in Figure 1. A member 13 is secured to the sleeve 9 by such means as a cap screw or bolt 14 which, it will be noted, is mounted in the wall of the member 13 and has its inner end received in threaded engagement with the wall of the sleeve 9. Thus, it will be noted that the member 13 and the housing 15, at the lower end thereof, are mounted for swinging movement about the axis of the sleeve 9.

A drive shaft 16 is rotatably mounted in a sleeve 17, mounted for rotary movement in bearings 18 and 19, provided in the tubular casing 5. The sleeve 17 has a head 21 seated against the face 22, provided at one end of the casing 5, as shown in Figure 1. One end of the shaft 16 is operatively connected with the engine crank shaft 23 by means of a suitable clutch 24, operable by a clutch lever 25, having a rod 26 leading therefrom to the driver's seat, usually provided at the forward end of the boat. The rear end of the drive shaft 16 has a beveled pinion 27 secured thereto which constantly meshes with a bevel gear 28, terminally and non-rotatably secured to the upper end of an intermediate shaft 29. A bevel pinion 31 is secured to the lower end of the intermediate shaft 29 and meshes with a pinion 32, secured to the propeller shaft 33, and having a propeller 34 mounted thereon as shown in Figure 1. The propeller shaft 33 is supported in a suitable anti-friction bearing 35 and a sleeve bearing 36. Suitable take-up washers 37 are provided adjacent the sleeve bearing 36 to take up end play of the propeller shaft 33. A cap 38 is provided in the lower housing 15 whereby access may be had to the interior thereof. The screw 14 securely locks the member 13 to the sleeve 9 so that the propeller 34 will be swung about the axis of the intermediate shaft 29, when the sleeve is rotated. The weight of the propeller and its associated parts will be carried by the head 11 of the sleeve 9 engaging the upper face 12 of the hub 8 of the transmission housing 6.

Figure 4:
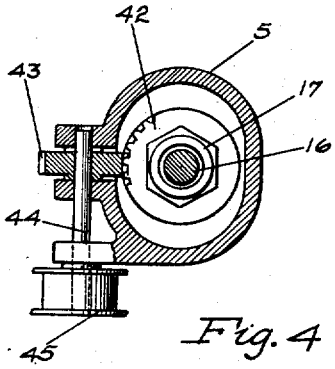
Figure 4 is an enlarged detailed sectional view on the line 4—4 of Figure 1.

Means are provided for relatively swinging the propeller about the axis of the shaft 29 to guide the boat in its course. Such means comprises a gear segment 39 rotatably mounted upon the head 11 of the sleeve 9. The segment 39 meshes with a relatively smaller segment 41, terminally provided upon the sleeve 17, mounted in the tubular casing 5. A spiral gear 42 is keyed to the opposite end of the sleeve 17 and meshes with a similar gear 43, secured to a short shaft 44 mounted in suitable bearings as shown in Figure 4. A flanged pulley or wheel 45 is secured to the shaft 44 adapted to have a cord or cable 46 coiled thereabout, the sections of which pass under suitable guide pulleys 47, shown in Figure 2. The pulleys 47 are so located that the points of contact of the cables therewith, will be substantially in alinement with the axes of the pivots 3, thereby preventing shortening or lengthening of the cables 46, when the mounting is vertically adjusted.

Figure 5:
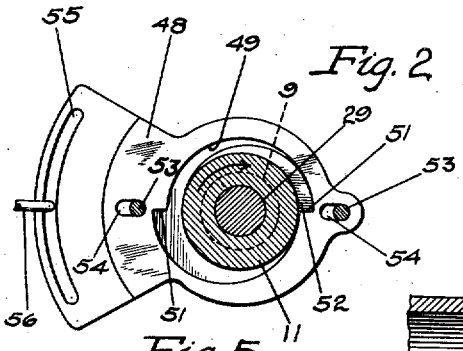
Figure 5 is a detail sectional view on the line 5—5 of Figure 1, showing the means for retaining the propeller in forward and reverse positions.
Figure 3:
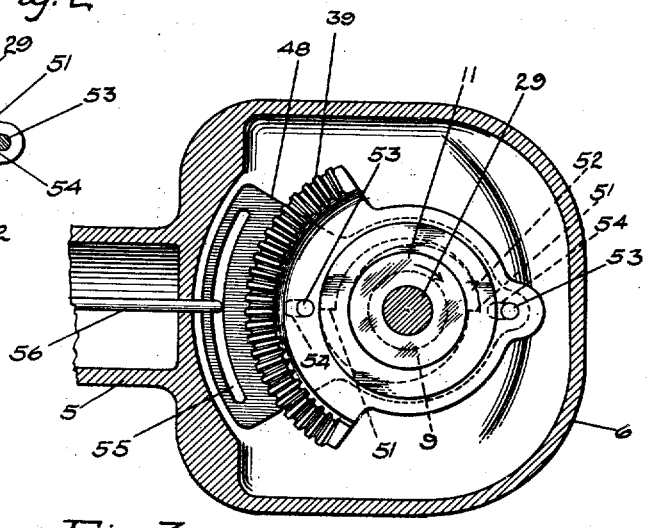
Figure 3 is a detail sectional view on the line 3—3 of Figure 1, showing the means provided for adjusting the position of the propeller to control the steering of the vessel.

An important feature of the invention resides in the means provided for shifting the propeller into forward and reverse positions. Such means is shown in Figures 1, 3, and 5 and comprises a plate 48 having a central opening 49 adapted to receive the head 11 of the sleeve 9. Abutments 51 are provided in the walls of the opening 49 adapted to be engaged by a detent 52, provided on one side of the head 11, as particularly shown in Figure 5. The plate 48 is rotatable with the gear segment 39 by means of the pins 53 secured in the segment 39 and traversing slots 54, provided in the plate 48 as shown in Figures 3 and 5.

A curved slot 55 is provided at one end of the plate 48 and has one end of a rod 56 engaged therewith which is slidably mounted in a bearing provided in the wall separating the interior of the tubular casing 5 from the interior of the gear housing 6. The opposite end of the rod 56 is pivotally connected with an arm 57, pivoted at 58 to the wall of the casing 5 and depending therefrom as shown in Figure 1. A control rod 59 has one end connected to the arm 57 and its opposite end to a link 61, pivoted at 62 to one of the brackets 2. The axis of the pivot 63 connecting the link 61 with the rod 59 is substantially alined with the axes of the pivots 3, supporting the motor 4 and the propeller mounting, so that tilting movement of the motor and mounting upon the pivots 3 will not change the adjustments of the plate 48. A rod 64 is connected with the rod 59 and link 61 and extends forwardly to the operator's seat.

In Figure 5, the detent 52 is shown engaged with the abutment 51 at the right hand side of the figure, which corresponds to the position of the associated parts as shown in Figure 1. When the plate 48 is moved rearwardly, the abutment 51 at the right hand side of Figure 5 will be moved out of engagement with the detent 52, whereupon the torque of the shaft 29 will immediately rotate the propeller housing 15 a half revolution, or until the abutment 52 engages the abutment at the left hand side of Figure 5, thereby arresting further movement of the housing 15 and, therefore the propeller 34. The head 11, carrying the detent 52, constantly tends to rotate in the direction indicated by the arrow in Figure 5, so that each time the plate 48 is moved from one position to the other, the propeller and the housing 15 will be rotated a half revolution about the axis of the intermediate shaft 29. When the propeller is positioned as indicated in dotted lines in Figure 1, the boat will be moved in a rearward direction, and, when positioned as shown in full lines in Figure 1, the boat will be moved forwardly when the propeller is operated. Thus, it will be seen that the forward and rearward movements of the boat is controlled entirely by movement of the control rod 64.

Another feature of the invention resides in the provision of the strut 65, shown in Figures 1 and 2. This strut, it will be noted, has a ball-and-socket connection 66 with the lower portion of the housing 15 and has its upper end slidably and pivotally connected with the bottom of the boat, by means of a slotted bracket 67 and pin 68. The strut 65 provides a guard for the propeller, and, because of its pivotal connection with the housing 15 and its sliding connection with the bottom of the boat, when the strut engages an obstruction in the water or the bottom of the lake, the strut will move the propeller mounting upwardly to the position shown in Figure 2, thereby preventing the propeller form striking the lake bottom or coming in direct contact with obstructions, such as logs or stones, reposing at the bottom of the lake.

A cable 69 has one end connected to the tubular casing 5 and passes upwardly over a sheave or pulley 71, thence forwardly to the operator's seat. This cable provides means for manually elevating the propeller as shown in Figure 2. A second cable 72 is connected with the bottom of the casing 5 and passes under a pulley 73, secured to the bottom of the boat and thence forwardly to the operator's seat. This cable provides means for forcibly holding the mounting and propeller in the position shown in Figure 1, when the propeller is operated in reverse, as indicated in dotted lines in Figure 1, and particularly when starting the vessel when heavily loaded. Under ordinary conditions, the cables 69 and 72 are left sufficiently slack to allow the propeller mounting to be oscillated by the strut 65, should the latter engage an obstruction in the water. A cover plate 74 is detachably secured to the gear housing 6 so that access may be had to the interior thereof.

Figure 6:
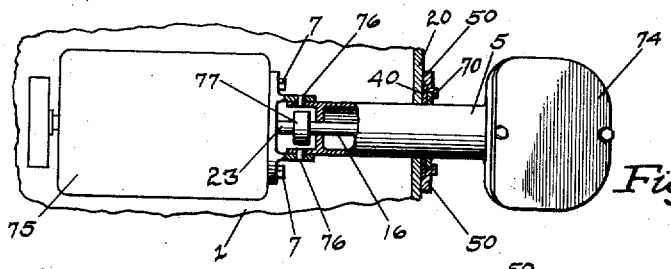
Figure 6 is a view illustrating a modified form wherein the engine is fixedly mounted in the vessel.
Figure 8:
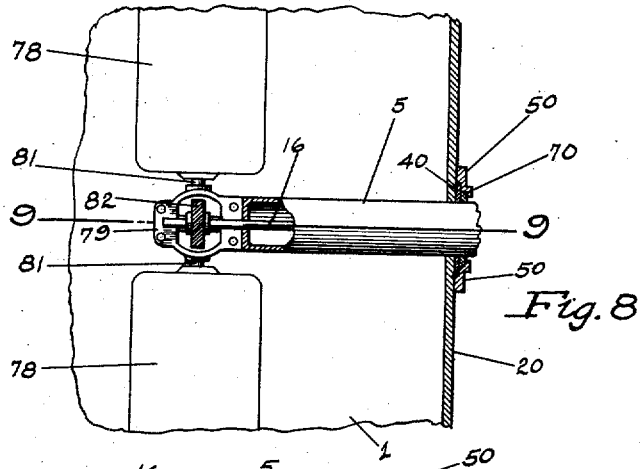
Figure 8 is a plan view, showing another modified form wherein the propeller driving shaft is likewise mounted for swinging movement in a vertical plane, and showing it connected to twin engines.

Referring to Figures 1 and 2, it will be noted that the tubular casing 5, in this instance, projects through the rear wall 20 of the boat, and to permit vertical movement of the casing with respect to the wall 20, an elongated opening 30 is provided therein as shown. To prevent leakage between the casing 5 and the slotted opening in the rear wall of the boat, a plate 40 is slidably mounted in guides 50 secured to the rear wall 20, as shown in Figures 6 and 8. The plate 40 has a relatively shorter elongated opening 60 adapted to receive the casing 5 and to permit vertical movement of the casing therein. A second plate 70 has an aperture adapted to snugly receive the casing 5, as shown in Figure 1. This plate is movable with the casing and is supported in run-ways provided in the guides 50 as shown in Figures 6 and 8. The joint between the plate 70 and the casing 5 is provided with suitable packing, not shown, to prevent leakage.

Figure 7:
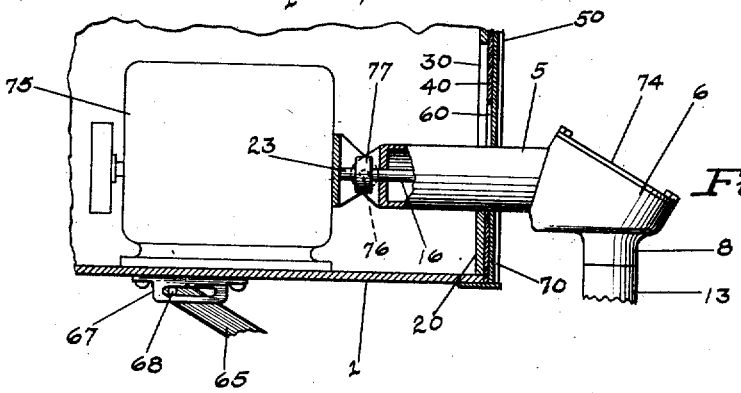
Figure 7 is a side elevation of Figure 6.

Figures 6 and 7 illustrate a modified form wherein the engine 75 is fixedly mounted in the boat and the tubular casing 5 is pivotally connected thereto by suitable pivots 76. The drive shaft 16 is provided with a universal joint 77 so that the mounting may be vertically adjusted while the propeller is being operated.

Figure 9:
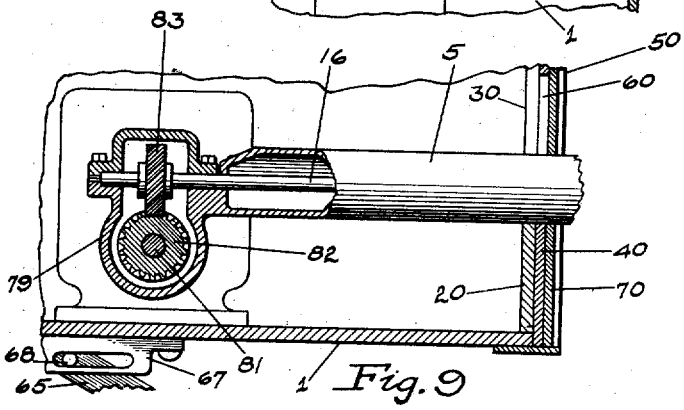
Figure 9 is a detailed sectional view on the line 9—9 of Figure 8.

Figures 8 and 9 illustrate another modified form wherein twin engines 78 are employed instead of a single engine, such as shown in Figures 1, 2, 6, and 7. In this instance, the tubular casing 5 is shown as having a gear housing 79 provided at one end thereof and pivotally connected to the crank shafts 81 of the engines 78. A spiral gear 82 is secured to the crank shafts 81 and meshes with a similar gear 83, secured to the drive shaft 16. In the form here shown, the engines 78 are also stationary and the propeller mounting, including the tubular casing 5, will swing about the axis of the engine crank shafts 81.

We have found that by mounting and operating the propeller as shown and described in this application, the boat may be conveniently operated in shallow water, as the strut 65 positively prevents the propeller from striking objects in the water and, likewise, it prevents it from striking the bottom when the boat is cruising in shallow water. Also, by mounting the propeller ahead of the housing 15 and member 13, it is rendered more effective than when mounted back of its supporting means, as is customary in most propeller mountings. The boat may be conveniently guided in the water by simply manipulating the cable sections 46 to slightly oscillate the propeller, thus dispensing with the use of a rudder. The operation of reversing the movement of the boat in the water is also very simple and positive in operation, it being only necessary to shift the position of the plate 48, whereupon the torque of the intermediate shaft 49 will immediately swing the propeller from its forward to its reverse position, indicated in full and dotted lines, respectively, in Figure 1. It will also be noted that the pivots 3 supporting the motor 4, are located comparatively close to the bottom of the boat so as to decrease the pulling angle of the propeller with respect to the horizontal, when the propeller is operating in reverse position. By minimizing this angle, the tendency of the propeller to lift, when operating in reverse, will be lessened. We have also found that by thus mounting the propeller and its operating means in the boat, the propeller may be shifted into reverse when the boat is moving forwardly in the water without danger of imparting excessive strains to the rear end of the boat, because of the fact that the propeller and its supporting means will tend to lift in the water when thus suddenly thrown from forward to reverse.

The apparatus as shown in Figures 1 and 2, may be assembled as a unit and installed in a boat within a comparatively short length of time. The structures shown in Figures 6 to 9, inclusive, are adapted for larger vessels wherein heavy motors are used which may be too heavy to tilt to the position shown in Figure 2.

We claim as our invention:

1. In a propeller mounting for boats, the combination of a supporting member having a shaft journaled in one end thereof, a pivotal support within the boat for said mounting, a propeller secured to said shaft and offset from the longitudinal center line of said mounting and having its axis arranged substantially parallel to said center line, said pivotal support being located a suitable distance forwardly of the propeller to cause the mounting, when the propeller is operating in reverse position and under normal conditions, to substantially retain its normal position, but when subjected to an abnormal load, while in reverse, said mounting and propeller will automatically lift to relieve the parts of excess strains.

2. In a propeller mounting for boats, the combination of a supporting member having a shaft journaled at one end thereof, a propeller secured to said shaft, a pivotal support for said member located within the boat, the axis of said pivotal support being located above the axis of said propeller shaft and forwardly of the plane of the propeller, and the distance between said axes being less than the horizontal distance between the axis of said pivotal support and the medial plane of the propeller, thereby causing the propeller to retain an operative position in the water without a lock, when operating under normal conditions to propel the boat rearwardly, and a strut having one end pivotally connected to said supporting member below and adjacent to said propeller shaft, and the opposite end of said strut having a movable connection with the bottom of the boat, said strut providing a guard for said propeller when cruising in shallow water, and also functioning to automatically elevate the propeller and mounting when said strut engages an obstruction in the water.

3. In a propeller mounting for boats, the combination of a supporting member having a shaft journaled at one end thereof and having a propeller secured thereto, a pivotal support for said member located within the boat and forwardly of the propeller, a strut having one end pivotally connected to said supporting member below and adjacent to said propeller shaft, and the opposite end of said strut having a movable connection with the bottom of the boat, said strut extending downwardly beneath the propeller and providing a guard therefor, and also functioning to elevate the propeller and mounting when said strut engages an obstruction in the water, and the distance between the axis of said pivotal support and the medial plane of the propeller being greater than the distance between the axes of the pivotal support and said propeller.

4. In a propeller mounting, the combination of a supporting member, a pivotal support for one end of said member located in a boat, a shaft journaled in the opposite end of said supporting member and having a propeller secured thereto and adapted for swinging movement in a vertical plane, and said pivotal support being located forwardly of the plane of said propeller and above the axis thereof, the distance between the axis of said pivotal support and the medial plane of the propeller being greater than the distance between the axes of the pivotal support and the propeller, whereby said propeller mounting will retain a substantially normal operating position, when the propeller is operating in reverse and with a substantially normal load, and when operating in reverse under an abnormal load the propeller may lift to a more ineffective position in the water to relieve the parts of excessive strains.

5. In a propeller mounting, the combination of a supporting member, a pivotal support for one end of said member located in a boat, a shaft journaled in the opposite end of said supporting member and having a propeller secured thereto and adapted for swinging movement in a horizontal plane, to guide the boat, said pivotal support being located forwardly of and above said propeller, whereby said propeller mounting will retain a substantially normal operating position, when the propeller is operating in reverse and with a normal load, and when operating in reverse under an abnormal load, said propeller is adapted to automatically lift to a more ineffective position in the water to relieve the parts of excessive strains, and a strut having its forward end movably connected with the boat bottom, extending downwardly therefrom beneath the propeller and having its rear end pivotally connected with the lower portion of the supporting member.

6. In a propeller mounting, the combination of a casing adapted for connection with an engine mounted within a boat, a member rotatably connected with said casing and depending therefrom, a propeller journaled in the lower end of said member, means operatively connecting the propeller with the engine, and means for rotating said member to swing the propeller with respect to said casing to guide the boat, said casing and member being mounted for a swinging movement and adapted to automatically vertically adjust the propeller in the water.

7. In a propeller mounting, the combination of a casing adapted for connection with an inboard engine, said casing traversing the rear wall of the boat and movable therein, a member rotatably connected with said casing and depending therefrom, a shaft journaled in the lower end of said member and having a propeller mounted thereon, means operatively connecting the propeller shaft with the engine, and means for rotating said member to swing the propeller shaft in a plane substantially parallel to the longitudinal centerline of said casing, whereby the propeller may be adjusted to guide the boat.

8. A propeller mounting comprising a casing adapted for connection with an inboard engine, one end of said casing projecting through the rear wall of the boat and having a hub depending therefrom, a member rotatably connected with said hub and having a propeller journaled in the lower end thereof, means operatively connecting said propeller with the engine, means for retaining said member in adjusted positions, and means for releasing said member, whereby the torque of the driving connection between the propeller and engine will cause the member to be rotated a half revolution to reverse the direction of movement of the boat.

9. A propeller mounting comprising a casing adapted for connection with an engine mounted within a boat, one end of said casing projecting through the rear wall of the boat and having a hub depending therefrom, a member rotatably connected with said hub and having a propeller journaled in the lower end thereof, means operatively connecting said propeller with the engine, control means for partially rotating said member to swing the propeller with respect to said casing to guide the boat, and means for temporarily releasing said member from said control means, whereby the torque of the driving connection between the propeller and engine will cause the member to be rotated a half revolution to reverse the direction of movement of the boat.

10. A propeller mounting comprising a casing adapted for connection with an engine mounted within a boat, one end of said casing projecting through the rear wall of the boat and having a hub depending therefrom, a member rotatably connected with said hub and having a propeller journaled in the lower end thereof, means operatively connecting said propeller with the engine, a gear segment operatively connected with said member, means for manually actuating said gear segment to partially rotate said member to swing the propeller with respect to said casing, and means for releasing said member from said segment whereby the torque of the driving connection between the propeller and engine will cause the member to be rotated a half revolution to reverse the direction of movement of the boat, and the propeller-supporting end of said mounting being adapted to swing in a vertical plane to raise the propeller to a higher position in the water, whereby the propeller may clear obstructions.

11. A propeller mounting comprising an engine adapted to be mounted within a boat, a casing connected therewith and projecting through the rear wall of the boat, a gear housing terminally provided on said casing, and having a member rotatably connected therewith and depending therefrom, a propeller journaled in the lower end of said member, a drive shaft in said casing connected with the engine, an intermediate shaft operatively connecting said drive shaft with said propeller, and said propeller-supporting member being adapted for swinging movement in a plane substantially parallel to the axis of said drive shaft to guide the boat, and the propeller-supporting end of said mounting being adapted to swing in a vertical plane to raise the propeller to a higher position in the water, whereby the propeller may clear obstructions.

12. A propeller mounting comprising an engine adapted to be mounted within a boat, a casing connected therewith and projecting through a wall of the boat, a gear housing terminally provided on said casing and having a member rotatably connected therewith and depending therefrom, a propeller journaled in the lower end of said member, said casing, housing and member being adapted for vertical movement to relatively adjust the propeller in the water, a drive shaft in said casing connected with the engine, an intermediate shaft operatively connecting said drive shaft and propeller, said propeller supporting member being adapted for rotary movement in a plane substantially parallel to the axis of said drive shaft to guide the boat.

13. A propeller mounting comprising an engine adapted to be mounted within a boat, a casing connected therewith and projecting through a wall of the boat, a gear housing terminally provided on said casing and having a member rotatably connected therewith and depending therefrom, a propeller journaled in the lower end of said member and normally positioned forwardly thereof, a drive shaft in said casing connected with the engine, an intermediate shaft operatively connecting said drive shaft with the propeller, and a strut connected with said member and the boat and normally positioned to be engaged by an obstruction in the water to protect the propeller and to automatically lift the propeller over such obstruction.

14. A propeller mounting comprising an engine having a casing connected therewith and adapted to project through a wall of a boat, a gear housing terminally provided in the casing, a member rotatably connected with said housing and depending therefrom, a propeller journaled in the lower end of said member, a drive shaft in said casing connected with the engine, an intermediate shaft mounted in said housing and member and having geared connections with said drive shaft and propeller shaft, the torque of the intermediate shaft constantly tending to rotate said member with respect to said housing, means for manually partially rotating said member to change the position of the propeller with respect to the housing and for controlling movement of the boat in the water, spaced abutments and a detent for locking the propeller supporting member in either forward or reverse positions, and means for releasing said detent from said abutments, whereby the torque of said intermediate shaft will cause the propeller to shift from one position to the other.

15. A propeller mounting comprising an engine adapted to be mounted within a boat, a casing connected therewith and projecting through an aperture provided in the rear wall of the boat, a gear housing terminally provided on said casing and having a member rotatably connected therewith and depending therefrom, a propeller journaled in the lower end of said member, said casing being adapted for vertical movement to relatively adjust the position of the propeller in the water, a drive shaft in said casing connected with the engine, and an intermediate shaft operatively connecting said drive shaft with said propeller.

16. A propeller mounting comprising an engine adapted to be mounted within a boat, a casing connected therewith and projecting through an aperture provided in the rear wall of the boat, a gear housing terminally provided on said casing and having a member rotatably connected therewith and depending therefrom, a propeller journaled in the lower end of said member, said casing being adapted for vertical movement in said boat wall to relatively adjust the position of the propeller in the water, a drive shaft in said casing connected with the engine, an intermediate shaft operatively connecting said drive shaft with said propeller, and said propeller supporting member being adapted for swinging movement to provide means for guiding the boat in the water.

17. The combination with a boat having an aperture in the rear wall thereof, of a propeller mounting comprising a casing having one end pivotally supported within the boat and connected with an engine, said casing traversing the aperture in said rear boat wall, and having a depending portion located exteriorly of the boat, a propeller mounted in said depending portion, and said casing being adapted for up-and-down movement in said aperture to relatively adjust the position of the propeller in the water.

18. The combination with a boat having an elongated aperture in the rear wall thereof, of a propeller mounting comprising a casing having one end pivotally supported within the boat and connected with an engine, said casing traversing the aperture in said rear boat wall and having a depending portion located exteriorly of the boat, a propeller mounted in said depending portion, said casing being adapted for up-and-down movement in said aperture to relatively adjust the position of the propeller in the water, and means movable with said casing and cooperating with means on said rear boat wall to prevent leakage around said casing.

19. In a propeller mounting, a transmission housing carrying a propeller, a substantially horizontally disposed drive shaft extending from the housing through a wall of the boat and connected to an engine mounted within the boat, a pivotal support for said housing, means for turning the propeller to steer the boat, and means permitting said mounting and propeller to raise from normal operating position automatically, when meeting an obstruction.

20. In a propeller mounting, a housing having a transmission therein, a propeller supported by the housing and operatively connected with said transmission, a substantially horizontally disposed drive shaft operatively connecting said transmission with an engine within a boat and extending through a wall of the boat, a pivotal support for said housing, and means for turning the propeller to guide the boat, said mounting and propeller being adapted to be tilted automatically from normal operating position when the boat meets an obstruction in the travel of the propeller.

21. In a propeller mounting, a housing having a transmission therein, a propeller supported by the housing, means operatively connecting the propeller with the transmission, a substantially horizontally disposed drive shaft operatively connecting said transmission with an engine within a boat and extending through a wall of the boat, a pivotal support for said housing, means for turning the propeller to guide the boat, and means operable to permit said mounting and propeller to raise automatically from normal operating position, when a member engages an obstruction in the water.

22. In a propeller mounting, a housing having a transmission therein, means depending from said housing and supporting a propeller, means operatively connecting the propeller with said transmission, a substantially horizontally disposed drive shaft connecting the transmission with an engine within a boat and extending through a wall of the boat, a pivotal support for said housing, and means for turning the propeller to guide the boat, said mounting being adapted to swing about the axis of said pivotal support with the parts in normal operating position to automatically clear an obstruction in the water.

23. In a propeller mounting, a housing having a transmission therein, means depending from said housing and supporting a propeller, means operatively connecting the propeller with said transmission, a substantially horizontally disposed drive shaft connecting the transmission with an engine within a boat and extending through a wall of the boat, a pivotal support for said housing and propeller, and means in connection with the mounting for guiding the boat, said pivotal support permitting the propeller in the normal operating position of the parts to swing about the axis thereof to automatically clear an obstruction in the water.

24. In a tiltable propeller mounting, a rotable support attached to said mounting and carrying a propeller, means connecting the propeller with an engine mounted within a boat, means for rotatably adjusting the propeller to steer the boat, and means for releasing said support so that the torque of the propeller will turn the support a partial revolution for reversing the direction of movement of the boat, and said mounting passing through a wall of the boat and adapted for relative movement therein.

25. A boat propulsion, comprising a normally tiltable transmission unit, a drive shaft operably connecting said transmission unit with an engine mounted within a boat, a substantially vertical support rotatably connected with said transmission unit and carrying a propeller, said vertical support and propeller being releasable so that the torque of the propeller will turn the vertical support a partial revolution to reverse the direction of the boat, said transmission unit and support being, in the normal operating position of the parts, automatically tiltable by contact with an obstruction in the water, and said drive shaft extending through a wall of the boat an adapted for relative movement therein.

In witness whereof, we have hereunto set our hands this 29th day of October, 1931.

ROBERT T. SVENDSEN.
DAVID G. CHANDLER.